United States Patent [19]

Lailach et al.

[11] Patent Number: 4,797,163

[45] Date of Patent: Jan. 10, 1989

[54] PROCESS FOR THE PRODUCTION OF TITANIUM DIOXIDE PIGMENTS

[75] Inventors: Günter Lailach; Karl-Heinz Schultz, both of Krefeld, Fed. Rep. of Germany

[73] Assignee: Bayer Akteingesellschaft, Leverkusen-Bayerwerk, Fed. Rep. of Germany

[21] Appl. No.: 88,949

[22] Filed: Aug. 24, 1987

[30] Foreign Application Priority Data

Sep. 5, 1986 [DE] Fed. Rep. of Germany ....... 3630220

[51] Int. Cl.$^4$ ................................................ C09C 1/36
[52] U.S. Cl. ...................................... 166/437; 423/613
[58] Field of Search ...................... 106/300, 309, 437; 423/82, 83, 613

[56] References Cited

U.S. PATENT DOCUMENTS

| | | | |
|---|---|---|---|
| 3,433,594 | 3/1969 | Wilson et al. | 423/613 |
| 3,436,180 | 4/1969 | Mas et al. | 423/613 |
| 3,446,590 | 5/1969 | Michal et al. | 423/613 |
| 3,929,962 | 12/1975 | Shiah | 423/82 |

OTHER PUBLICATIONS

2244 Research Disclosure, Feb. 1981, No. 202, Havant Hampshire, Great Britain, "Clean Gas From Coal Replaces Distillate Oil".

*Primary Examiner*—Amelia Burgess Yarbrough
*Attorney, Agent, or Firm*—Connolly & Hutz

[57] ABSTRACT

Energy required for the calcining or drying operations in the production of titanium dioxide by the sulfate process and the chloride process is at least in part provided by burning by-product offgases containing carbon monoxide obtained in the chlorination of titanium-containing raw materials under reducing conditions.

10 Claims, No Drawings

PROCESS FOR THE PRODUCTION OF TITANIUM DIOXIDE PIGMENTS

This invention relates to a process for the production of titanium dioxide pigments.

BACKGROUND OF THE INVENTION

Titanium dioxide pigments are produced by the sulfate process and by the chloride process.

The sulfate process is based on the digestion of titanium-containing raw materials with sulfuric acid. Titanium dioxide hydrate is precipitated from the solution formed by hydrolysis. After removal of impurities, the hydrolyzate is calcined and ground. The calcination step is carried out primarily in rotary kilns. Heating of the rotary kilns is by fuel oil or natural gas and involves high energy consumption.

In the chloride process, titanium tetrachloride is obtained from titanium-containing raw materials by chlorination under reducing conditions at 700° to 1200° C. Petroleum coke is used as the reducing agent.

After the separation of chlorides formed from impurities in the starting materials, titanium tetrachloride is burnt at temperatures of 900° to 1400° C. to form titanium dioxide pigment.

The titanium dioxide pigments obtained by the sulfate or chloride process are generally subjected to an inorganic and/or organic aftertreatment.

In the inorganic aftertreatment, oxides, oxide hydrates, silicates and/or phosphates are deposited, generally from aqueous solution, onto the titanium dioxide pigment suspended in water.

The titanium dioxide pigments are then filtered off, dried and micronized. Before micronization or even before drying, the titanium dioxide pigments are generally subjected to an organic aftertreatment with dispersants, such as silicones, amines, phosphoric acid esters and organic acids.

The drying of the aftertreated titanium dioxide pigments is advantageously carried out in spray dryers or spin-flash dryers, the energy required generally being applied by combustion of natural gas or fuel oil.

In the production of titanium dioxide pigments by the chloride process, reaction gases which, in addition to titanium tetrachloride, contain dust-fine particles of the solid raw materials, chlorides of the secondary constituents of the titanium-containing raw materials and, above all, carbon monoxide and carbon dioxide accumulate during the chlorination of the titanium-containing raw materials. The carbon monoxide content of the reaction gases is generally 40 to 80%. In addition, the reaction gases may contain small quantities of chlorine, silicon tetrachloride, phosgene, hydrogen chloride, sulfur chlorides and carbon disulfide.

After separation of the dusts and the substantially involatile metal chlorides and after condensation of the titanium tetrachloride by cooling of the gases to temperatures near or below 0° C., an offgas mixture is obtained which, in addition to large amounts of carbon monoxide, also contains small quantities, of chlorine, titanium tetrachloride and other readily volatile compounds. Chlorine and titanium tetrachloride are generally removed by washing, after which the offgas still contains traces of chlorine and metal chlorides.

On account of its high carbon monoxide content, however, the offgas cannot be directly released into the atmosphere, instead the carbon monoxide has to be burnt before emission. This is normally done with the assistance of a supporting flame of natural gas or fuel oil.

The object of the present invention is to provide a particularly advantageous process for the production of titanium dioxide pigments. More particularly, the object of the invention is to reduce the high natural gas and fuel oil demand in the production of titanium dioxide pigments and hence to improve the economy of production.

BRIEF DESCRIPTION OF THE INVENTION

It has now surprisingly been found that offgases containing carbon monoxide which accumulate in the production of titanium tetrachloride by the chloride process may be used as heating gases in the drying and/or calcination steps involved in the production of titanium dioxide pigments.

Accordingly, the present invention relates to a process for the production of titanium dioxide pigments which is characterized in that offgases containing carbon monoxide which accumulate in the production of titanium tetrachloride by the chloride process are used as heating gas in the drying and/or calcination steps of the process.

DETAILED DESCRIPTION

The process according to the invention is preferably applied to the production of titanium dioxide pigments by the chloride process.

However, the process according to the invention surprisingly also affords major advantages in the production of titanium dioxide pigments by the sulfate process.

In one embodiment of the process according lo lhe invention, the offgases are used in the drying of aftertreated lilanium dioxide pigmenls. The offgases are preferably used in the drying of the filter cake which accumulates during the filtration of inorganically aftertreated litanium dioxide pigmenls from an aqueous suspension. It is of advantage to purify the waste gases before they are used as heating gas to such an extent that the quality of the titanium dioxide piqments is not impaired.

Where titanium dioxide Pigments are produced by the chloride process and by the sulfate process in one and the same place, the offgases may advantageously be used in the calcination of the hydrolyzate accumulating in the sulfate process.

In one preferred variant of the process according to the invention, 10 to 90% of the heating energy required for drying of the aftertreated titanium dioxide pigments and for calcination of the hydrolyzate accumulating in resulfate process is applied by burning natural gas or fuel oil to ensure safe and stable combustion of the carbon monoxide in the offgases.

By applying the process according to the invention, large parts of the energy required for drying and calcination processes may be applied in the production of titanium dioxide pigments. The economy of titanium dioxide pigment manufacture both by the chloride process and by the sulfate process may thus be distinctly improved for the same pigment quality.

The following Example is intended to illustrate the advantages of the process according to the invention without limiting the invention in any way.

EXAMPLE

After separation of dusts and solid metal chlorides and after alkaline scrubbing, the offgases from the production of titanium tetrachloride by chlorination of rutile sand in the presence of petroleum coke at 980° C. contained 57% by volume carbon monoxide, 34% by volume carbon dioxide, 6% by volume steam, 3% by volume $N_2$ and 12 ppm by volume total chlorine. 260 $m^3$ of this offgas accumulated per metric ton of titanium tetrachloride produced (all figures for the gas volumes are based on standard conditions).

The titanium tetrachloride was burnt in known manner to titanium dioxide pigment. After an inorganic aftertreatment of the pigment, a filter cake containing 49% by weight dry matter was obtained. The drying of this filter cake in a spin-flash dryer would normally require 125 $m^3$ natural gas (calorific value: 32,000 $kJ/m^3$) per metric ton $TiO_2$ pigment. According to the invention, 570 $m^3$ of the purified offgas were burnt together with 15 $m^3$ natural gas per metric ton titanium dioxide pigment and the hot gases fed into the dryer. Replacement of the predominant part of the natural gas by the offgas did not produce any disadvantages. Around 10% of the offgas accumulating could not be utilized. Accordingly, it was possible to save 110 $m^3$ natural gas per ton titanium dioxide pigment produced.

What is claimed is:

1. In an improved process for the production of titanium dioxide pigments wherein titanium-containing raw materials are chlorinated under reducing conditions to produce titanium tetrachloride and by-product offgases, the titanium tetrachloride is oxidised to titanium dioxide, washed calcined and/or dried, the improvement comprises burning the by-product offgases to provide at least a part of the heat energy required in the calcining or drying steps.

2. An improved process according to claim 1 wherein the by-product offgases comprise carbon monoxide.

3. An improved process according to claim 1 wherein natural gas or fuel oil is burned in mixture with the by-product offgases.

4. An improved process according to claim 3 wherein by-product offgases provide 10 to 90% of the energy obtained by burning the mixture.

5. An improved process according to claim 1 wherein the titanium dioxide is washed and filtered to produce a wet filter cake and said cake is dried by the heat energy obtained by burning combustible gases comprises the by-product offgases.

6. In an improved process for the production of titanium dioxide pigments wherein titanium-containing raw materials are digested with sulfuric acid and titanium dioxide is precipitated from solution by hydrolysis and calcined, the improvement comprises burnin9 by-product offgases from a chlorination of titanium-containing raw materials under reducing conditions to provide at least a part of the heat energy required in said calcining step.

7. An improved process according to claim 6 wherein the by-product offgases comprise carbon monoxide.

8. An improved process according to claim 6 wherein natural gas or fuel oil is burned in mixture with the by-product offgases.

9. An improved process according to claim 8 wherein by-product offgases provide 10 to 90% of the energy obtained by burning the mixture.

10. An improved process according to claim 6 wherein the titanium dioxide is washed and filtered to produce a wet filter cake and said cake is dried by the heat energy obtained by burning combustible gases comprising the by-product offgases.

* * * * *